(12) United States Patent
Ekkert

(10) Patent No.: US 11,185,874 B2
(45) Date of Patent: Nov. 30, 2021

(54) NOZZLE TIPS WITH NECK PORTIONS FOR REDUCED CLEANING TIMES

(71) Applicant: Phoenix Closures, Inc., Naperville, IL (US)

(72) Inventor: Len Ekkert, Lemont, IL (US)

(73) Assignee: PHOENIX CLOSURES, INC., Naperville, IL (US)

( * ) Notice: Subject to any disclaimer, the term of this patent is extended or adjusted under 35 U.S.C. 154(b) by 283 days.

(21) Appl. No.: 16/033,047

(22) Filed: Jul. 11, 2018

(65) Prior Publication Data
US 2020/0016811 A1    Jan. 16, 2020

Related U.S. Application Data

(63) Continuation of application No. 16/032,578, filed on Jul. 11, 2018.

(51) Int. Cl.
*B05B 1/34*     (2006.01)
*B05B 1/16*     (2006.01)
(Continued)

(52) U.S. Cl.
CPC .............. *B05B 1/3442* (2013.01); *B05B 1/06* (2013.01); *B05B 1/169* (2013.01); *B05B 1/3489* (2013.01); *B29C 45/278* (2013.01); *B29C 2045/2759* (2013.01); *B29C 2045/2775* (2013.01); *B29C 2045/2777* (2013.01)

(58) Field of Classification Search
CPC .......... B29C 45/278; B29C 2045/2759; B29C 2045/2775; B29C 45/2777; B05B 1/3442; B05B 1/06; B05B 1/169; B05B 1/3489
See application file for complete search history.

(56) References Cited

U.S. PATENT DOCUMENTS

| 2,500,401 A | 3/1950 | Cossette |
| 3,253,302 A | 5/1966 | Peters et al. |
| (Continued) | | |

FOREIGN PATENT DOCUMENTS

| CA | 2686188 | * | 11/2009 | ............ B29C 45/20 |

OTHER PUBLICATIONS

Office Action for U.S. Appl. No. 16/032,578 dated Feb. 20, 2020.
(Continued)

*Primary Examiner* — Matthew J Daniels
*Assistant Examiner* — Shibin Liang
(74) *Attorney, Agent, or Firm* — Husch Blackwell LLP

(57) ABSTRACT

The invention relates to nozzle tips including a nozzle body and a tip portion, configured to minimize the accumulation of a resin on the nozzle tip as it is dispensed through the nozzle tip. The nozzle tip can contain a central flow channel and an internal portion that branches and guides the resin into multiple exiting flow channels that define tangential pathways to the outer surface of the nozzle tip. The nozzle tip can include grooves that define extended, sharply angled flow paths for the resin.

Nozzle tips can have a neck portion separating a nozzle body and a tip end of the nozzle tip; here, a doughnut-shaped space located around the neck portion can be defined by the base of the nozzle, the crown of the nozzle, and the neck portion, for encouraging turbulent flow of the resin to scour the nozzle tip during dispensing.

16 Claims, 5 Drawing Sheets

(51) Int. Cl.
*B05B 1/06* (2006.01)
*B29C 45/27* (2006.01)

(56) References Cited

U.S. PATENT DOCUMENTS

| | | | |
|---|---|---|---|
| 3,295,169 | A | 3/1967 | Moslo |
| 3,902,665 | A | 9/1975 | Hendry |
| 3,954,209 | A | 5/1976 | Ramond |
| 4,427,361 | A | 1/1984 | Saito |
| 4,678,427 | A | 7/1987 | Fritzsche |
| 4,781,554 | A | 11/1988 | Hendry |
| 5,059,113 | A | 10/1991 | Ito et al. |
| 5,513,976 | A | 5/1996 | McGrevy |
| 5,545,028 | A * | 8/1996 | Hume .............. B29C 45/30 264/328.15 |
| 6,789,745 | B1 | 9/2004 | Babin et al. |
| 7,238,019 | B2 | 7/2007 | Schwenk |
| 7,344,372 | B2 | 3/2008 | Fairy |
| 9,833,799 | B2 | 12/2017 | Minnette et al. |
| 2003/0082266 | A1 | 5/2003 | Babin |
| 2007/0263479 | A1 * | 11/2007 | Hennes ............... B29C 48/565 366/82 |
| 2011/0117238 | A1 | 5/2011 | Gunther et al. |
| 2016/0046073 | A1 | 2/2016 | Hadas |
| 2018/0169921 | A1 * | 6/2018 | Schiffers ............ B29C 45/62 |
| 2019/0293039 | A1 | 9/2019 | Shaull et al. |

OTHER PUBLICATIONS

Office Action for U.S. Appl. No. 16/032,578 dated Jul. 14, 2020.
U.S. Appl. No. 16/032,578 Amendment dated May 18, 2020.
Office Action and Notice of References Cited for U.S. Appl. No. 16/032,578 dated Nov. 9, 2020.
Amendment for U.S. Appl. No. 16/032,578 dated Dec. 3, 2020.
Office Action from related U.S. Appl. No. 16/032,578, dated Mar. 29, 2021.
Amendment filed as response to Mar. 29, 2021 Office Action from related U.S. Appl. No. 16/032,578, dated Jun. 1, 2021.

* cited by examiner

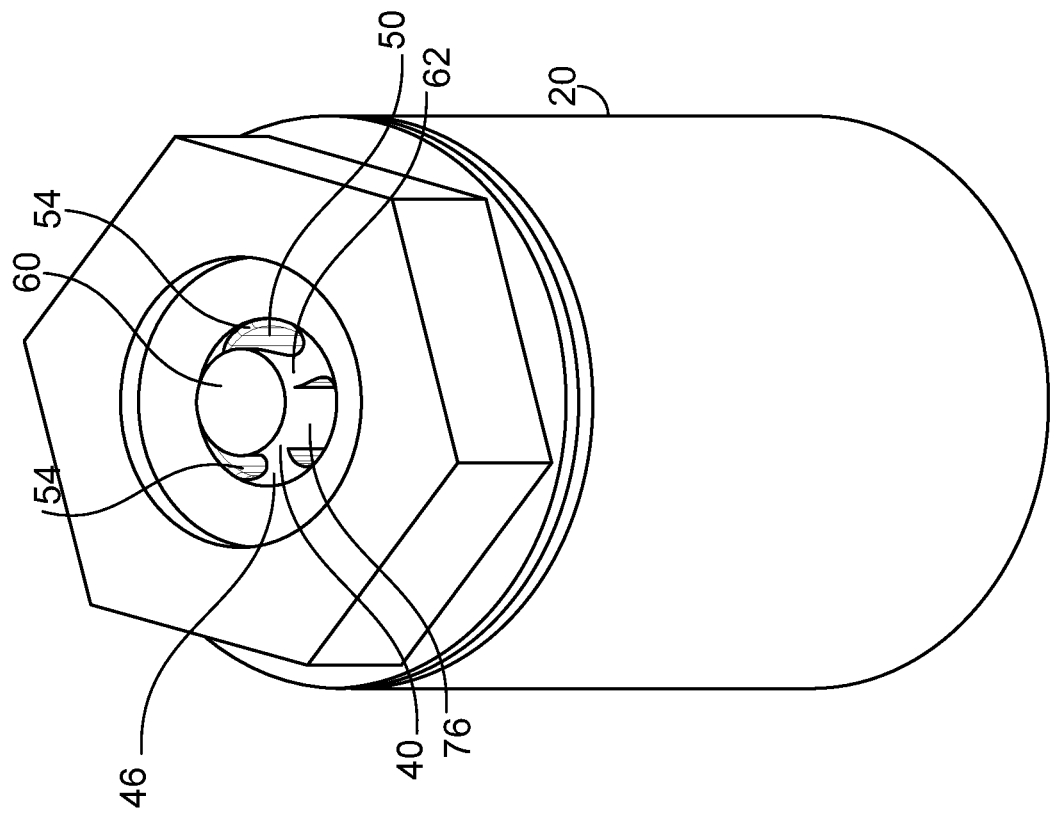
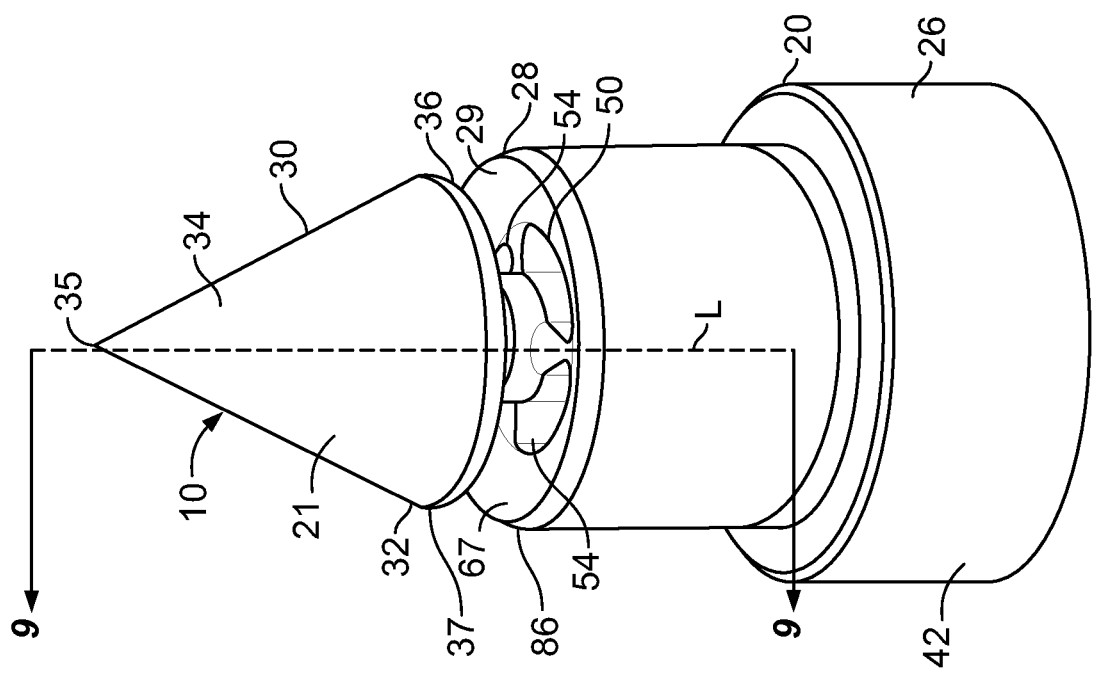
FIG. 2
FIG. 1

NOZZLE TIPS WITH NECK PORTIONS FOR REDUCED CLEANING TIMES

CROSS REFERENCE TO PRIOR APPLICATIONS

This application is a continuation of copending application Ser. No. 16/032,578 filed on Jul. 11, 2018.

BACKGROUND OF THE INVENTION

This invention relates generally to a nozzle having a nozzle tip that provides improved delivery of a liquid or flowable material, such as resin, through the nozzle and relates particularly to an improved nozzle tip for injection molding.

Nozzles are typically used to dispense resins or other flowable materials for injection molding. Nozzles are also used in other fields to dispense other liquids or flowable materials, such as inks, paints, and food products. Such nozzles can be used to dispense more than one kind of flowable material. However, when a user changes from dispensing one resin to another, all of the old resin must be cleared from the nozzle and particularly from the nozzle tip. If not, then leftover old resin can bleed into the stream of new resin and render the new resin unusable until the old resin is completely cleared from the nozzle tip. However, extensive time and effort can be required to thoroughly clear residual old resin from a nozzle tip.

Nozzle tips can contain "dead spots" along the path through which the flowable material or resin travels, locations where portions of the flowable material can accumulate and build up.

Dead spots are likely to occur at locations in the flow path where resin encounters a pocket-like or concave structure. A portion of the resin can collect in such structures and get left behind while the remaining resin flows past the pocket of resin. Dead spots can occur at locations in the flow path where nozzle tip structures meet and form a two-dimensional crease or fold (where two planes meet) or a three-dimensional corner (where more than two planes meet). Resins can get caught in the pockets, corners, and creases created by these structures and remain there until later washed or flushed out.

In a conventional nozzle tip, resin can accumulate where it encounters a dead spot, such as concave structures, in its flow path, pooling in a cavity or depression or collecting in pocket-like configurations in the nozzle tip. Such pockets can be found where a resin delivery channel divides or separates into multiple flow streams.

These pockets of resin can impede the even flow of resin through and from the nozzle. These resin pockets can create a particular problem when the delivery of a first resin is completed and a second, different resin is delivered through the same nozzle. If the accumulated first resin is not removed, then it can bleed into the newly-loaded second resin, resulting in the initial delivery of a mixture of resins, rather than the delivery of the new resin alone. Such mixed resins can have undesirable color or consistency; other physical characteristics can also be affected, such as viscosity, tensile strength, or melting temperature. Mixed resins can perform in unpredictable or inconsistent manners, which can be especially problematic where the presence of mixed materials is not readily detectable.

Such resin mixtures can be prevented by removing all traces of the first resin before loading the second resin, but this process can be costly and time-consuming, and can require additional efforts to remove the cleaning agent used to remove the leftover resin. Thorough cleaning can also require disassembly of the nozzle, during which time the nozzle is unavailable for use, and creates the risk of other contaminants being introduced into the nozzle tip. There is also the possibility that such cleaning efforts can be unsuccessful in removing all of the built-up resin.

An alternative solution to remove accumulations of the first resin is to dispense a stream of the second resin until all of the first resin is flushed away. This, too, can be time-consuming, expensive, and can wasteful of resin materials. Also, it can be difficult to tell when the flushing is complete; too little flushing and mixed resins are initially dispensed, too much flushing and resin materials are wasted.

There is a particular need for a nozzle tip with fewer or smaller dead spots, decreasing the amount of resin that builds up in and on the nozzle tip, thus reducing the amount of cleaning needed between uses or, ideally, eliminating the need for cleaning the nozzle tip between the uses of different resins. It is therefore desirable to provide a simple and effective nozzle tip design that reduces or eliminates structures in which resins can accumulate and/or encourages continuous flow through and from the nozzle tip. Nozzle tips, and nozzles incorporating these nozzle tips, according to the present invention achieve this result with features that minimize the buildup of flowable materials along their flow paths through the nozzle tips.

BRIEF SUMMARY OF THE INVENTION

This invention generally relates to an improved nozzle tip configured with features that decrease or eliminate the buildup of flowable materials at dead spots in and around the flow path defined by the nozzle tip. By minimizing this undesired buildup of resin, less cleaning or flushing is required to later remove it from the nozzle tip, and can have the added benefit of saving resin materials, labor, and time.

Some embodiments of the invention relate to a nozzle tip for dispensing a flowable material including a) a nozzle body connected to a tip portion, with a neck portion positioned therebetween, the nozzle body including: i) a nozzle base portion on a first end of the nozzle body, the nozzle base portion for connecting to an apparatus for dispensing the flowable material; ii) a nozzle crown at a second end of the nozzle body, opposite the nozzle base portion, the nozzle crown disposed around the neck portion; iii) a central flow channel within the nozzle body, a terminal end of the central flow channel branching into a plurality of exiting flow channels; and iv) the plurality of exiting flow channels, each exiting flow channel having: 1) a first end comprising an inlet, the inlet communicating with the central flow channel, and 2) a second end opposite the first end comprising a port, the port communicating with the nozzle crown; b) the tip portion having a tip end and a tip base opposite the tip end, the tip base disposed around the neck portion; and c) the neck portion having a first neck segment attaching to the tip base, a second neck segment attaching to the nozzle crown, and a third neck segment extending into the central flow channel, respectively; where the exiting flow channels are arranged radially around the third neck segment, and each exiting flow channel abuts the third neck segment; and where the flowable material is transported through the central flow channel and exiting flow channels, respectively, and is extruded through the ports in a lateral turbulent flow toward the tip base.

Aspects of these embodiments can include the third neck segment tapering to a point.

Aspects of these embodiments can include an outer edge of the nozzle crown having an elevation closer to the tip portion than an inner edge of the nozzle crown.

Aspects of these embodiments can include the nozzle crown surrounding the neck portion, and a juncture between the nozzle crown and the second neck segment defining an acute angle.

Aspects of these embodiments can include the tip base surrounding the first neck segment, and the tip base comprising a tip trough defining a groove surrounding the neck portion.

Aspects of these embodiments can include the neck portion being cylindrical and the tip trough defining an annular ring around the neck portion.

Aspects of these embodiments can include a diameter of the neck portion being smaller than a diameter of the tip base, and the diameter of the tip base being smaller than a diameter of the nozzle crown.

Another aspect of the invention can include an apparatus comprising an embodiment of the nozzle tip.

Some embodiments of the invention relate to a nozzle tip for dispensing a flowable material having a) a nozzle body joined to a tip portion, the nozzle body having a nozzle crown enclosing an end of the nozzle body, and an interior central flow channel; and b) the tip portion comprising, respectively: i) a tip end having a base tapering away from the nozzle body; ii) a neck portion separating the tip end from the nozzle body; and iii) a branch point extending in a tapering fashion into the central flow channel, the branch point dividing the central flow channel into a plurality of exiting flow channels, each exiting flow channel having an end communicating with the nozzle crown; where a toroidal space located around the neck portion is defined by the base of the tip end, the neck portion, and the nozzle crown; and where the flowable material can be dispensed through the central flow channel, the exiting flow channels, and the toroidal space, respectively, before delivery to the tip base.

Aspects of the invention can include the branch point defining exiting flow channels radially arranged around a central longitudinal axis of the nozzle body.

Aspects of the invention can include the nozzle crown surrounding the neck portion, and an outer edge of the nozzle crown extending away from the neck portion and toward the tip end.

Aspects of the invention can include the tip end including a tip base surrounding the neck portion, the tip base comprising a tip trough defining a groove surrounding the neck portion.

Aspects of the invention can include the neck portion being cylindrical and the tip trough defining an annular ring around the neck portion.

Aspects of the invention can include the circumference of the nozzle crown being greater than the circumference of the tip base.

Another aspect of the invention can include an apparatus comprising an embodiment of the nozzle tip.

Some embodiments of the invention relate to a nozzle tip for dispensing a flowable material comprising: a nozzle body joined to a tip portion, the nozzle body having an interior central flow channel branching into a plurality of exiting flow channels; and the tip portion comprising a central base, a tip end tapering away from the central tip base, and a neck portion tapering away in the opposite direction from the tip end; where first and second segments of the neck portion separate the nozzle body from the neck portion, and a third segment of the neck portion separates the central flow channel into the plurality of exiting flow channels; and where the flowable material can be dispensed through the central flow channel and the exiting flow channels to introduce a turbulent flow of the flowable material against the central base of the tip portion.

Aspects of the invention can include the first and second segments of the neck portion, the base of the tip portion, and an end of the nozzle body defining a doughnut-shaped space around the neck portion that separates the tip base from the nozzle body.

Aspects of the invention can include the tip base extending a shorter distance from a longitudinal axis of the nozzle tip than the nozzle body end; the tip base comprising a groove surrounding the neck portion, and the tip base faces and facing the nozzle body end; and a junction of the nozzle body end and the neck portion defining an acute angle.

A more detailed explanation of the invention is provided in the following description and claims and is illustrated in the accompanying drawings.

BRIEF DESCRIPTION OF THE FIGURES

The accompanying drawings illustrate the present invention and together with the description, further serve to explain the principles of the invention and to enable a person skilled in the relevant art to make and use the invention.

These and other features and advantages of the present invention will be apparent from the following detailed description, claims, and accompanying drawings.

FIG. 1 shows an exterior view of an embodiment of a nozzle tip having a neck portion;

FIG. 2 shows a perspective view of a cross-section of a nozzle tip having a neck portion, the cross-section made through the neck portion of the nozzle tip;

DETAILED DESCRIPTION OF THE INVENTION

Figure 4:
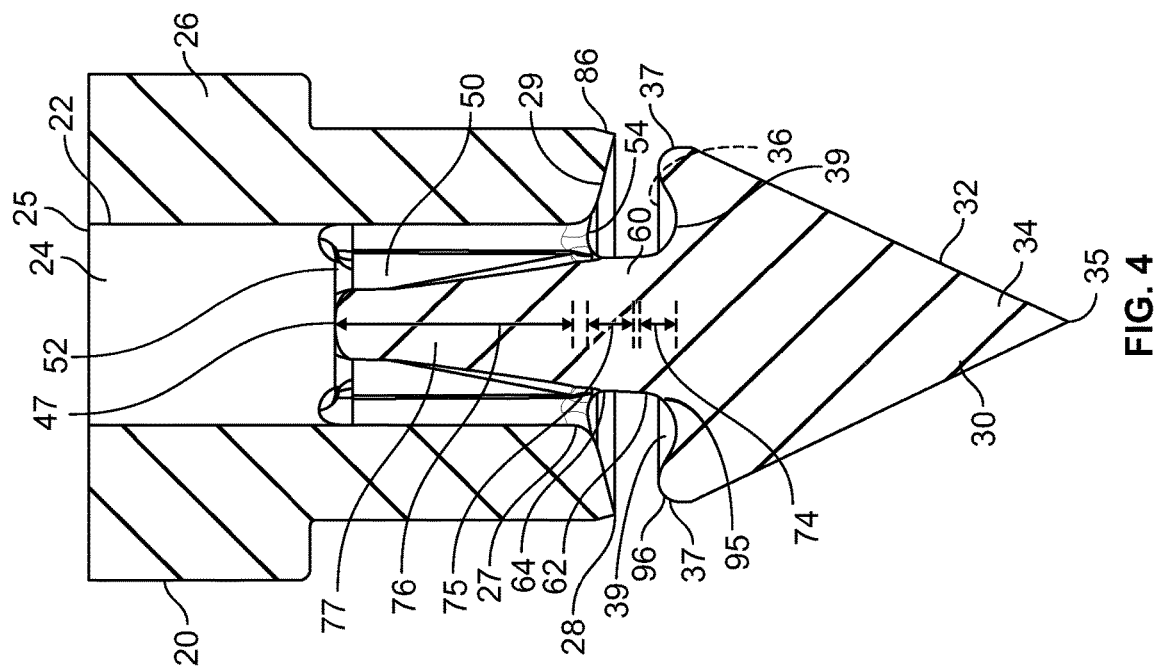
FIG. 4 shows a perspective view of a cross-section of a nozzle tip having a neck portion, the cross-section made through a central longitudinal axis of the nozzle tip.

While this invention is susceptible of embodiments in many different forms, there are shown in the drawings and will be described in detail herein specific embodiments with the understanding that the present disclosure is to be considered as an exemplification of the principles of the invention. It is not intended to limit the invention to the specific illustrated embodiment.

The features of the invention disclosed herein in the description, drawings, and claims can be significant, both individually and in any desired combinations, for the operation of the invention in its various embodiments. Features from one embodiment can be used in other embodiments of the invention.

It should be further understood that the title of this section of this specification, namely, "Detailed Description Of The Invention," relates to a requirement of the United States Patent & Trademark Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

Referring to FIGS. 1-9, embodiments of a nozzle tip and nozzle are shown in accordance with the present invention. The invention relates to an improved nozzle tip configured to minimize or prevent the entrapment and/or accumulation of flowable material at locations in or on the flow path defined by the nozzle tip.

Overview of Embodiments of the Invention

Generally, the nozzle tip 10 is made of a nozzle body 20 with a tip portion 30. Some embodiments can include a neck portion 60 that separates the nozzle body 20 and the tip portion 30, while other embodiments can include the nozzle body 20 directly joined to the tip portion 30 (FIGS. 1-9). The nozzle body 20 defines a passageway or cavity in its interior for transporting the resin or flowable material to extrude the resin at multiple sites on the nozzle tip 10, at multiple sites in the nozzle body 20 or the tip portion 30. The nozzle body 20 can dispense resin through a main or central flow channel 24 that travels through the interior of the nozzle body 20 and branches out into one or more delivery channels 50. Each delivery channel 50 can have an opening or inlet 52 on one end that communicates with the central flow channel 24 and one or more openings or outlets or ports 54 on the opposite end for communicating with the outer surface 32, 21 of the tip portion 30 or the nozzle body 20, respectively. After a flowable material is dispensed outside of the nozzle body 20, the material can flow onto the outer surface 21 of the nozzle tip 10, which delivers the material to its destination.

The nozzle tip 10 can include a nozzle body 20 having a base portion 26 and a tip portion 30, each having an outer surface 21, 32, respectively. The base and tip portions 26, 30 can be joined together directly, or have a neck portion 60 between them.

On the end opposite (or furthest from) the tip portion 30, the nozzle body 20 can terminate in a nozzle base portion 26, the base portion 26 for communicating with an apparatus containing a resin or other flowable device (not shown). The end of the nozzle body 20 that is closest the tip portion 30 can be directly or indirectly connected to the tip portion 30.

At the end closest to the nozzle body 20, the tip portion 30 can have a tip base 36. The tip base 36 can connect to the nozzle body 20 and can adjoin or abut the terminal end 25 of the central flow channel 24. Most or all of the tip base 36 can be located within the interior of the nozzle tip 10. The tip portion 30 can include a tip end 34 connected to the tip base 36, the tip end 34 can narrow or taper away from the tip base 36 into a convex shape. For example, the tip end 34 can taper into an apex 35 with a point or other structure to define a profile or volume that is generally associated with the end of a nozzle tip (i.e., conical, pyramidal, trapezoidal, frustoconical).

The tip portion can include a branching portion 40, the branching portion 40 for dividing the central flow channel 24 into multiple exiting flow channel channels. The branching portion 40, which can be located in the interior portion of the nozzle tip 10, can be contoured to divert the flow of resin from the central flow channel 24 into the exiting flow channels 50. The branching portion 40 can include the part of tip portion 30 located closest to, or communicating with, the nozzle base portion 26. The branching portion 40 can extend into the central flow channel 24 and can have a convex shape. For example, the branching portion 40 can narrow or taper or protrude into a branch point 46, which can include an apex 47 with a sharp or blunt point.

In some embodiments, the tip end 34 and branching portion 40 can extend or taper in opposite directions, with the tip end 34 tapering on the exterior surface of the nozzle tip 10, and the branching portion 40 tapering into the interior portion of the nozzle tip 10.

When an apparatus employs the nozzle tip 10 to dispense a flowable material such as a resin, the resin can move from a resin-containing apparatus and through the nozzle tip 10 via a central flow channel 24 disposed in the interior of the nozzle body 20 along a central longitudinal axis of the nozzle body 20, the central flow channel 24 communicating with one or more exiting flow channels 50. Each exiting flow channel 50 can have two ends that define a hole or an opening; one end has an inlet 52 for diverting the resin from the central flow channel 24 into the exiting flow channel 50 and the other terminal end 25 has a port 54 through which the resin exits the nozzle tip 10. Each exiting flow channel 50 can have the same diameter or circumference throughout its length. Each exiting flow channel 50 can vary in its diameter or circumference along its length.

In some embodiments, the ports 54 of the exiting flow channels 50 can be located in the tip portion 30; here, the exiting flow channels 50 traverse through internal portions of the nozzle body 20 and the tip portion 30. The ports 54 can communicate with the outer surface 32 of the tip portion 30, to provide egresses for the resin. In some embodiments, when the nozzle tip is viewed from above, the exiting flow channels 50 can occupy a plane that is perpendicular to a longitudinal axis of the central flow channel 24.

The exiting flow channels 50 can define resin flow pathways that are linear, straight, or unbent, or define arcing or curving or spiraling pathways, or pathways with a bend or angle in them. The exiting flow channels 50 can connect with or intersect grooves 91 present on or kink the exterior or outer surface 32 of the tip portion 30, so that each set made of a connected exiting flow channel 50 and its corresponding groove 91 define a resin flow pathway having an angle, preferably a sharp angle or right angle, in it.

The exiting flow channels 50 can define pathways that extend radially from a longitudinal axis of the nozzle body 20 or nozzle tip 10, or those pathways can extend in directions tangential to the central flow channel 24, preferably directing the exiting resin toward a circumference of the nozzle tip 10 or tip portion 30.

The exiting flow channels 50 can be angled, to cause the exiting resin to flow in a swirling, turbulent vortex that can clean old or new resins from the structures of the nozzle tip 10 and from the structure of any housing that contains such a nozzle tip 10.

The inlets 52 of the exiting flow channels 50 can be positioned at the terminal end 25 of the central flow channel 24 so that the inlets 52 are spaced apart from each other. The exiting flow channels 50 can be positioned within the tip or neck portions 30, 60 so that their ports 54 are spaced apart in the outer surface 32 of the tip or neck portions 30, 60. The inlets 52 can define a plane relative to a central longitudinal axis of the central flow channel 24. The ports 54 can define a plane relative to a central longitudinal axis of the central flow channel 24. The plane defined by the inlets 52 can be parallel to the plane defined by the ports 54, or can share the same plane. It is preferred that one or both of these planes be perpendicular, or at a nearly perpendicular angle, to the central longitudinal axis of the central flow channel 24; such nearly perpendicular angle can be between 30-150 degrees, 45-135 degrees, 60-120 degrees, or 80-100 degrees.

At the terminal end 25 of the central flow channel 24, the inlets 52 can regularly spaced apart, even equidistant, from the central longitudinal axis of the central flow channel 24 or each other. On the outer surface 32 of the tip portion 30, the ports 54 can be spaced apart, preferably, the ports 54 are regularly spaced apart, even equidistant, from the central longitudinal axis of the central flow channel 24 or each other.

The diameter or circumference of the central flow channel 24 can be greater than the diameters or circumferences of the inlets 52 and the ports 54. In some embodiments, the circumferences or diameters of the inlets 52 can be equal to the circumference or diameters of the ports 54. Alternatively, the circumferences or diameters of the inlets 52 can be larger or smaller than the circumferences or diameters of the ports 54. In preferred embodiments, the inlets 52 and the ports 54 have the same size and/or shape. In preferred embodiments, the inlets 52 and the ports 54 lack sharp edges, protrusions, or pockets that could expose outflowing resin to frictional forces or frictional heat.

It is preferred that the nozzle tip 10 possess a central longitudinal axis that is also the central longitudinal axis as the nozzle body 20, central flow channel 24, tip portion 30, and/or neck portion 60.

Some such nozzle tips 10 can be configured to create or generate a resin outflow for scouring or cleaning out residual resin from the nozzle tip and/or a housing containing the nozzle tip 10, as the resin contacts those structures while the nozzle tip 10 is dispensing the resin. Other such nozzle tips 10 can be configured to create or generate turbulence in the outflowing resin, such as is generated when a liquid stream strikes a convex surface, so as to create a forceful washing effect on the nozzle tip 10 and/or structures that house or contain it.

Improved Nozzle Tip

As shown in FIGS. 1-9, embodiments of this nozzle tip 10 can include a nozzle body 20 joined or attached to a tip portion 30. The nozzle body 20 can include a nozzle base portion 26 for connecting to a resin-dispensing apparatus, and the nozzle base portion 26 can attach to the tip portion 30 at the end opposite the nozzle base portion 26.

The tip portion 30 can include a tip base 36, for joining the nozzle base portion 26, and a tip end 34 on the side or end opposite of the tip base 36, the tip portion 30 tapering to a sharp point or blunt end at the tip end 34.

In some embodiments, the nozzle tip 10 can be arranged around a central longitudinal axis and include structures with round, circular, or oval edges or boundaries, such as a cylindrical nozzle body 20 and a conical tip portion 30 (i.e., FIGS. 1-6). The nozzle base portion 26 can have a circumference or diameter equal to the circumference or diameter of the tip base 36. In some embodiments, the nozzle tip, the nozzle base portion 26 and tip portion 30 can have bilateral or equilateral symmetry around a plane intersecting a central longitudinal axis of the nozzle tip 10; in other embodiments, the nozzle tip 10 (i.e., FIGS. 3-4), the nozzle base portion 26 and tip portion 30 can have radial symmetry around the central longitudinal axis of the nozzle tip 10.

It is preferred that the outer surfaces of the nozzle tip 10 (i.e., nozzle base portion 26 and tip portion 30) be smooth and free from protrusions and indentations.

Figure 3:
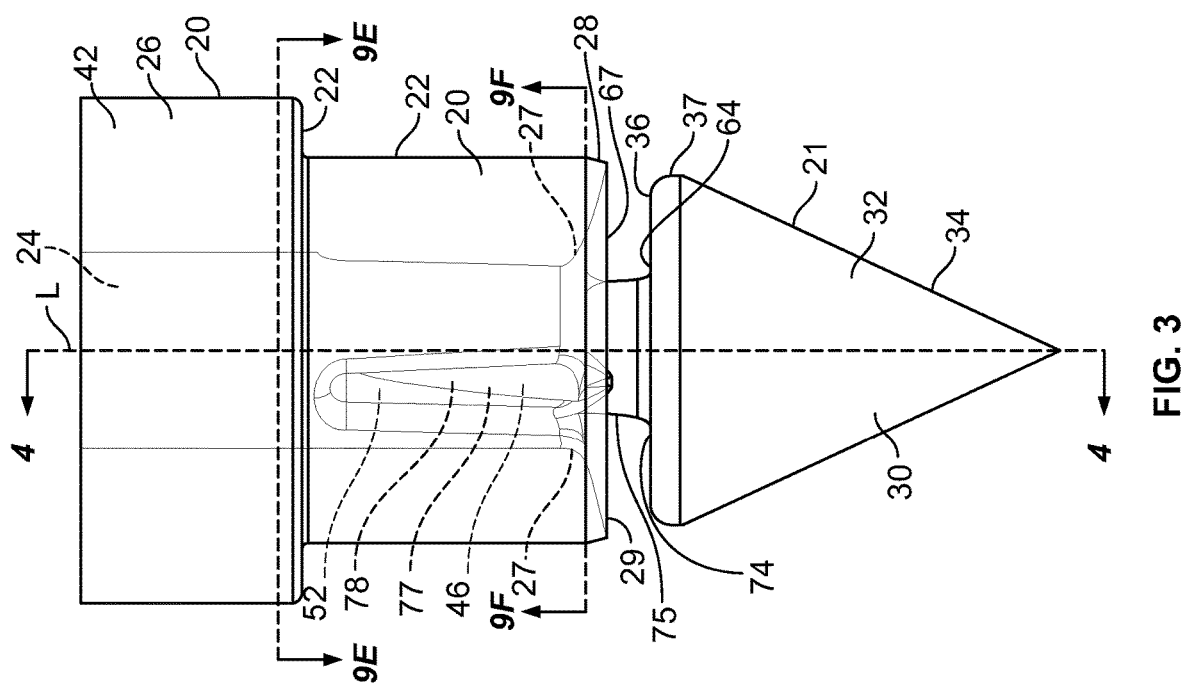
FIG. 3 shows a side view showing the internal structure of a nozzle tip having a neck portion.
Figure 6:
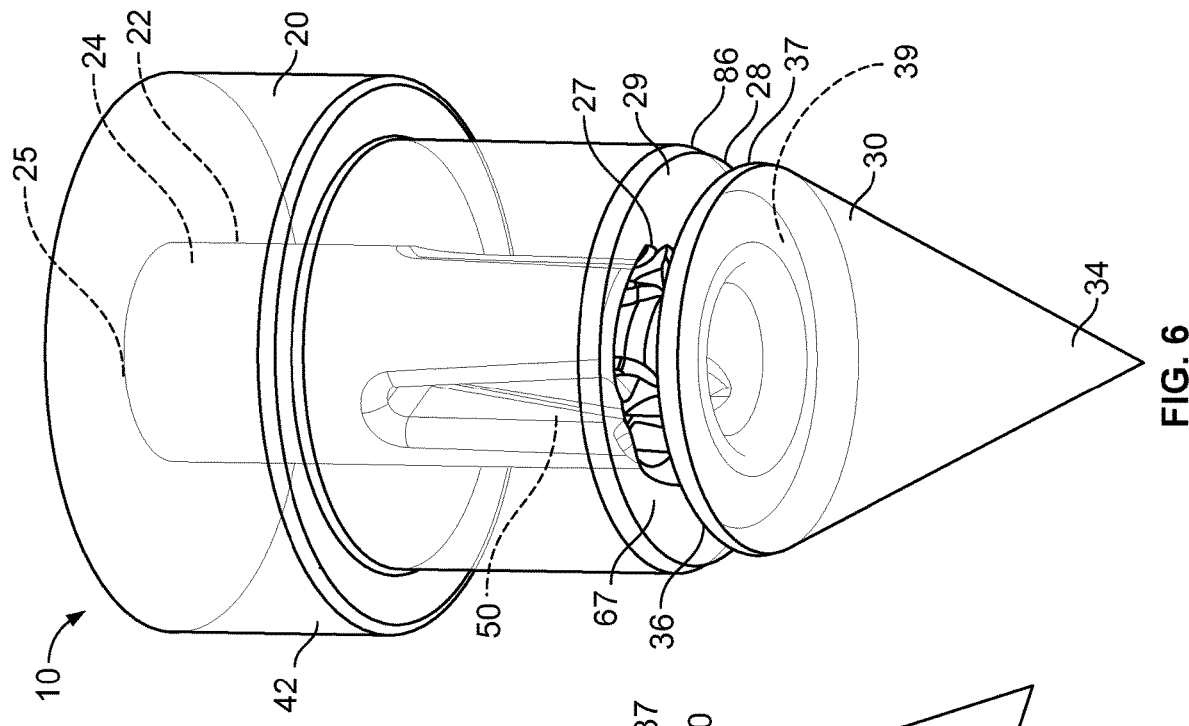
FIGS. 5-6 show perspective views showing the internal structure of a nozzle tip having a neck portion.
Figure 5:
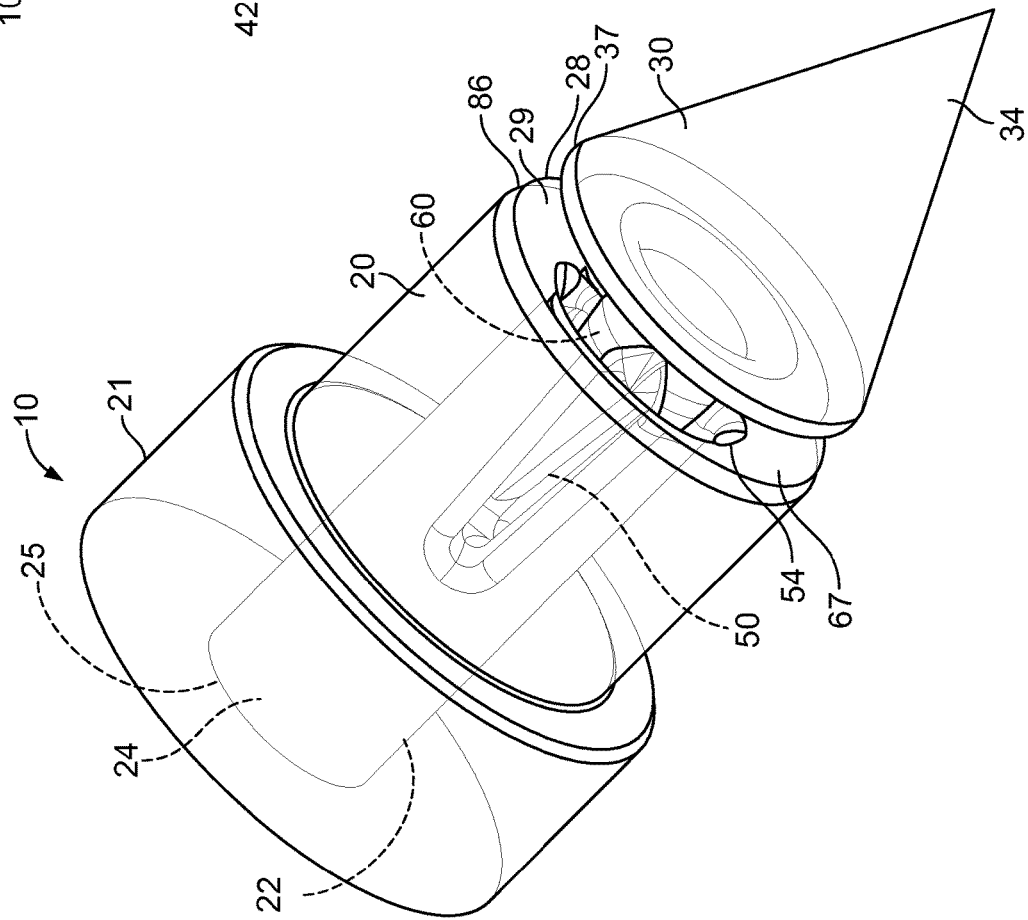

The nozzle body 20 can define an interior central flow channel 24 positioned along a central longitudinal axis of the nozzle tip 10, with one end of the central flow channel 24 for connecting to a resin-dispensing apparatus and the other terminal end 25 branching into one or more exiting flow channels 50. The central flow channel 24 can run the length of the nozzle body 20 and provide a passageway within the nozzle body 20 through which resin travels from the resin-dispensing apparatus, through the nozzle body 20, and toward to the tip portion 30. When in use, resin is delivered from the apparatus to the terminal end 25 of the central flow channel 24. The terminal end 25 can include or communicate with the base 36 of the tip portion 30.

Where the tip portion includes a branching portion 40 that is ringed or flanked or surrounded by a peripheral portion 43, the peripheral portion 43 can define the outer border or edge of the branching portion 40 and mark the junction between the tip base 36 and the branching portion 40 (i.e., FIGS. 3-4). The branching portion 40 is a structure that can guide the flow of resin from the central flow channel 24 to the exiting flow channels 50 positioned at locations adjoining the peripheral portion 43. Each exiting flow channel 50 can include an inlet 52 for transporting resin from the central flow channel 24 to the exiting flow channel 50, and can include a port 54 for dispensing resin from the exiting flow channel 50 to the exterior of the nozzle tip 10. It is preferred that the inlets 52 contact the peripheral portion 43 of the branching portion 40, rather than the inlets 52 being positioned to contact only the central flow channel 24.

Figure 7:
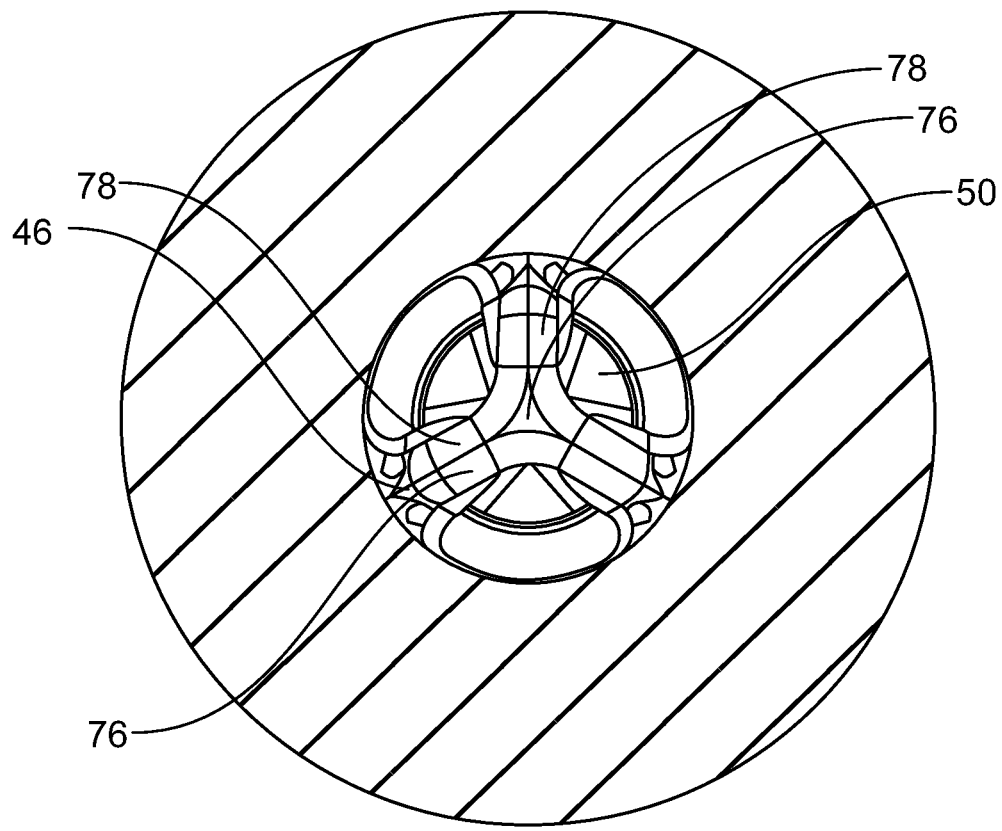
FIGS. 7-8 show top views of cross-sections of the nozzle body of FIG. 3, the cross-sections taken at different elevations to show the inlets of the exiting flow channels (FIG. 7) and the ports of the exiting flow channels (FIG. 8)

As shown in FIGS. 3 and 7, where there is a plurality of exiting flow channels 50, it is preferred that the exiting flow channels 50 be regularly spaced apart or arranged equidistant from each other in the nozzle tip 10. The exiting flow channels 50 can be positioned at regular intervals so that their inlets 52 are regularly spaced apart around the peripheral portion 43 and their ports 54 are regularly spaced apart in the outer surface 32 of the tip portion 30. The exiting flow channels 50 can be positioned at the peripheral portion 43 to define the same offset angle with respect to the peripheral portion 43. It is preferred that the inlets 52 and ports 54 define holes or openings that are round, oval, or teardrop-shaped.

When viewed from above, as in FIGS. 2 and 7, the path defined by each exiting flow channel 50 can describe a non-radial path between a longitudinal axis of the nozzle body 20 (or the central flow channel 24) and the tip base 36; that is, the path defined by each exiting flow channel 50 does not intersect a central longitudinal axis of the nozzle tip 10, nozzle body 20, and/or central flow channel 24. The exiting flow channels 50 can define paths that are neither parallel nor perpendicular to a central longitudinal axis of nozzle body 20, central flow channel 24, and/or tip portion 30. When viewed from above, the exiting flow channels 50 do not intersect with the central longitudinal axis of the central flow channel 24; if extended indefinitely, the pathways defined by the exiting flow channels 50 do not intersect with or contact the central longitudinal axis of the central flow channel 24.

When viewed from above, as in FIG. 7, if the exiting flow channels 50 were extended infinitely, they would not intersect to define a center point of a circle; instead, the exiting flow channels 50 would define secants around a common circle defined by the periphery 22 of the central flow channel 24. Where there are three exiting flow channels 50, their extended paths would define a triangle, preferably an equilateral triangle. Where there are four exiting flow channels 50, their extended paths would define a rectangle, preferably a square. Similarly, for any number of exiting flow channels 50 greater than two, their extended paths would define a polygonal shape having the same number of sides as the number of exiting flow channels 50; preferably, the paths would define regular polygonal figures having sides of equal lengths.

When viewed from above, as in FIG. 2, each exiting flow channel 50 has first and second sides 55, 56. It is preferred that the sides have different lengths, and that each exiting flow channel 50 have a first side 55 that is shorter than the second side 56.

It is preferred that the exiting flow channels 50 be arranged in a regular-spaced fashion around a central longitudinal axis of the central flow channel 24, preferably to so that the exiting flow channels 50 display radial symmetry around a longitudinal axis of the central flow channel 24. For example, for each neighboring pair of exiting flow channels 50, they can be arranged so that the longer side of one exiting flow channel 50 is closest to the shorter side of the other exiting flow channel 50; thus, no short side of an exiting flow channel 50 will be closest to the short side of the other exiting flow channel 50 (and no long side of an exiting flow channel 50 will be closest to the long side of the other exiting flow channel 50).

On a plane perpendicular to the central longitudinal axis of the central flow channel 24 (also called the horizontal nozzle plane), the plane defined by the ports 54, the exiting flow channels 50 can be directed outward in any direction that forms a non-radial angle (or is transverse to) with respect to the central flow channel 24. In comparison, the exiting flow channels 50 can be directed in either a radial angle in the vertical plane, as shown in FIGS. 1-4, or non-radial angle in the horizontal plane. In some embodiments, the exiting flow channels 50 are configured having an upward non-radial angle relative to the longitudinal axis of the central flow channel 24 and an outward non-radial angle relative to a plane perpendicular to the longitudinal axis of the central flow channel 24. In some embodiments, the ports 54 can define a plane other than truly perpendicular to the central longitudinal axis of the central flow channel 24, such as an angle can be between 30-150 degrees, 45-135 degrees, 60-120 degrees, or 80-100 degrees. In some embodiments, the exiting flow channels 50 can be positioned so as to direct outgoing resin toward a circumference of the nozzle tip 10, tip portion 30, or tip base 36.

Where the nozzle tip 10 is contained within a housing, the exiting flow channels 50 can be positioned to direct the flow stream of the exiting resin in direction tangential to the inner or interior surface of the housing, to introduce centrifugal movement to the exiting resin, which can scour or clean that surface 101 free of old or residual resins.

In some embodiments the exiting flow channels 50 can be angled to direct the resin toward the circumference of the nozzle tip 10, angled away from the nozzle base portion 26 and/or toward the tip end 34, or angled in both directions simultaneously.

Figure 8:
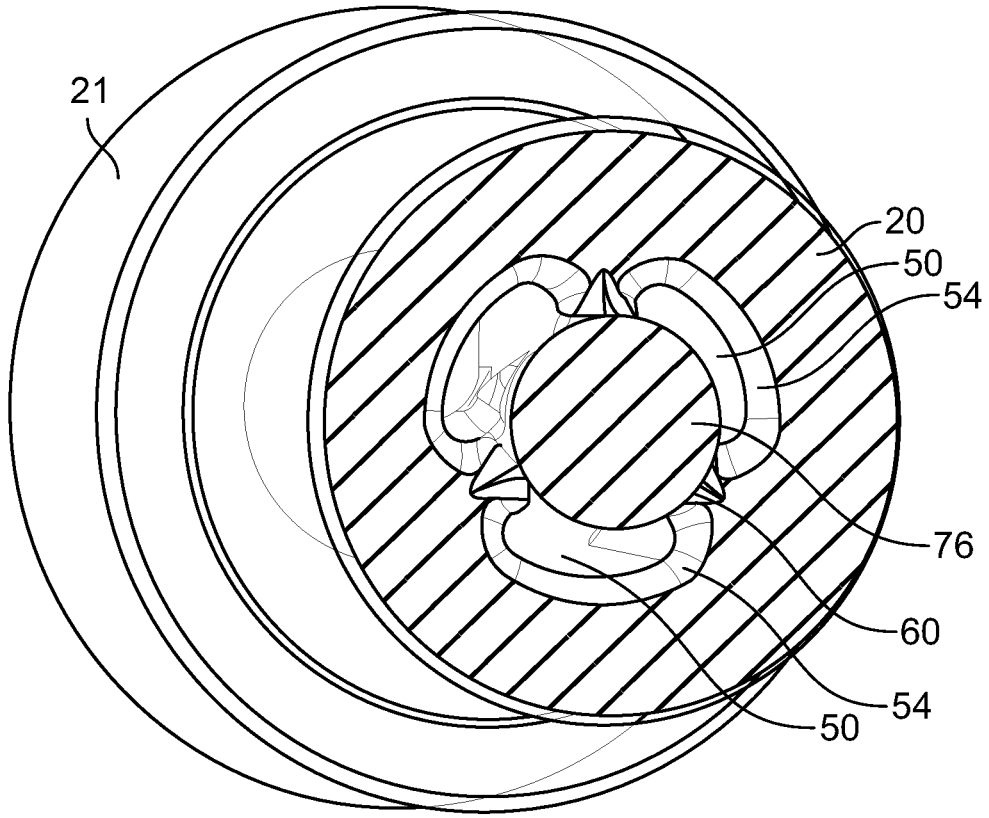

As shown in FIGS. 1-2 and 7-8, the inlets 52 can be spaced apart at regular intervals or arranged equidistant from each other along the terminal end 25 of the central flow channel 24, preferably along the peripheral portion 43 of the branching portion 40. The inlets 52 can regularly be spaced apart, even equidistant, from the central longitudinal axis of the central flow channel 24. The inlets 52 can define a plane that is perpendicular to the central flow channel 24 or the nozzle body 20. The ports 54 can be regularly spaced or arranged equidistant from each other along the outer surface 32 of the tip portion 30; in other embodiments, the ports 54 can contact the outer surface of the nozzle body 20. On the outer surface 32 of the tip portion 30, the ports 54 can be spaced apart, preferably, the ports 54 are regularly spaced apart, even equidistant, from the central longitudinal axis of the central flow channel 24 or each other. As shown in FIGS. 2 and 7-8, the ports 54 can define a plane that is perpendicular to the central flow channel 24 or the nozzle body 20. In preferred embodiments, the plane defined by the inlets 52 and the lane defined by the ports 54 are parallel to each other. Where there are multiple ports 54, each port can be located at the same first distance from the tip base, the same second distance from the tip end 34, and the same third distance from each other 50. Like the ports 54, the inlets 52 can define a plane other than truly perpendicular to the central longitudinal axis of the central flow channel 24, such as an angle can be between 30-150 degrees, 45-135 degrees, 60-120 degrees, or 80-100 degrees.

The central flow channel 24 and the exiting flow channels 50 can describe passageways that are tubular or cylindrical. Likewise, the inlets 52 and the ports 54 can have cylindrical or ovate shapes or borders. It is preferred that the inlets 52 and the ports 54 describe convex shapes; they can be smooth and lack protrusions and indentations. The junctures where each inlet 52 joins the central flow channel 24 can be smooth or beveled or chamfered edges that provide flow paths free of obstructive areas. That is, these junctures can lack creases or folds. Likewise, the junctures where each port 54 joins the outer surface 32 of the tip portion 30 can be smooth or beveled or chamfered edges that provide flow paths free of obstructive areas.

To ensure resin flow paths free of obstructive areas, the central flow channel 24 and the exiting flow channels 50 can be configured to have smooth or arcing paths, lacking angles or sharp bends, particularly where the central flow channel 24 meets the exiting flow channels 50 as shown in FIGS. 3-4. This can also be accomplished with exiting flow channels 50 having non-intersecting flow paths that deliver resins independently of each other; the lack of intersections between the exiting flow channels 50 could eliminate the possibility of dead spots at such locations. Alternatively, the exiting flow channels 50 can define straight or linear pathways that lack curves or angles, or pathways having angles or bends in them. In other embodiments, the exiting flow channels 50 can be angled, causing the resin to exit the nozzle tip 10 in a turbulent flow whose tornado-like or swirling flow paths can scour or wash clean the structures of the nozzle tip 10.

Potential dead spots can also be avoided or minimized with central flow channels 24 that are free of internal obstructions or protrusions where they meet the exiting flow channels 50, as such obstructions could form resin-trapping creases or pockets on their interior surfaces where they join these delivery channels.

The exiting flow channels 50 can be configured so that the inlets 52, the locations where the central flow channel 24 meets the exiting flow channels 50, lack a fold or crease or other resin-entrapping space exposed to the resin as it moves from the former location to the latter location, as shown in FIGS. 1-2. The juncture where the central flow channel 24 meets the exiting flow channels 50 can be smooth or have a convex shape, as long as the juncture is configured without structures that define the resin-trapping spaces that occur in some conventional nozzle tips.

In preferred embodiments, the inlets 52 are configured without obstructions or protrusions to impede the flow of the resin into the exiting flow channels 50 (see FIGS. 3-4).

The tip portion 30 can include (or have joined to it) a branching portion 40 that extends inward into the central flow channel 24. The branching portion 40 can be located in the interior of the nozzle tip 10, positioned so that the branching protrusion 46 is located within the interior of the central flow channel 24, pointing away from the tip base and the tip end 34.

As shown in FIG. 4, the branching portion 40 can taper or narrow to the branching point or branch protrusion 46; it is for guiding the flow of resin from the central flow channel 24 toward the inlets 52 of the exiting flow channels 50 positioned at locations adjoining the peripheral portion 43. The branch protrusion 46 can include a point or blunt end or apex 47 that points away from the tip end 34; the branch protrusion can point in the direction opposite the flow of the resin. In preferred embodiments, the end or tip of the branch protrusion 46 touches the central longitudinal axis of the central flow channel 24, nozzle body 20, and/or tip portion 30.

As shown in FIG. 4, the tip portion 30 can include a tip base 36 that communicates with the nozzle body 20 and a tip end 34 on the side opposite of the tip base 36. The tip portion 30 can be generally conical, frustoconical, or pyramidal in shape; it can include a tip base 36 that tapers or narrows to a tip end 34, and the tip end can have a sharp or blunt point. It is preferred that the outer surface 32 of the tip portion 30 be smooth and free of protrusions and indentations.

As shown in FIGS. 3-4, resin can flow through an apparatus for delivery through the nozzle tip 10. Resin can be introduced into the nozzle tip 10 via the central flow channel 24 in the interior of the nozzle body 20. The central flow channel 24 can be positioned along a central longitudinal axis of the nozzle tip 10, with one end of the central flow channel 24 for connecting to a resin-dispensing apparatus and the other terminal end 25 dividing or branching into a plurality of exiting flow channels 50. Each exiting flow channel 50 can include an inlet 52 for transporting resin from the central flow channel 24 to the exiting flow channel 50, and can include a port 54 for transporting resin from the exiting flow channel 50 to the exterior of the nozzle body 20. The extruded resin can flow over the outer surface 32 of the tip portion 32 to the tip end 34, which delivers the resin to its destination.

Improved Nozzle Tip with Grooved Surface on Tip Portion

Some embodiments of the improved nozzle tip 10 described above can create particular resin flow paths with certain configurations of exiting flow channels 50 and tip portions 30.

In such embodiments, the tip portions 30 can include a plurality of grooves located on the exterior or outer surface 32 of the tip end 34. Each groove can define a depression of indentation in the outer surface 32 of the tip end 34 of the tip portion 30. Each groove can be curved or define a straight line. Each groove can be positioned so that its length is perpendicular to the junction of the tip end 34 and the nozzle body 20. Each groove can be positioned so that its length is perpendicular to a central longitudinal axis of the nozzle body 20 and/or nozzle tip 10. Alternatively, a groove can define a curved, arcing, or angled pathway.

It is preferred that the grooves define a common plane on which all of the grooves exist; it is more preferred, that this common plane be perpendicular to the central longitudinal axis of the nozzle body 20 and/or nozzle tip 10.

Each groove can possess the same width throughout its entire length. The width of each groove can decrease along its length, so that the groove tapers on one end or adopts a teardrop or oval shape.

It is preferred that the grooves be located at regularly spaced distances from each other (i.e., equidistant from each other). Where the grooves have a perceivable orientation, it is preferred that all of the grooves be arranged in a head-to-tail fashion, or that all of the grooves point or be oriented in the same direction.

Each groove can have a first end and a second end. The first end of each groove can be oriented so as to join or connect with the port 54 of a corresponding exiting flow channel 50. It is preferred that the second end of each groove be oriented so as to not join or connect with any port 54 or any other groove.

In some embodiments, every exiting flow channel 50 joins a corresponding groove; in other embodiments, grooves can be found without a corresponding exiting flow channel 50, and vice-versa.

Where a groove meets a corresponding exiting flow channel 50, the exiting flow channel 50 can define a curved pathway, but an exiting flow channel 50 defining a straight, unbent, or linear pathway is preferred. It is preferred that the exiting flow channel 50 be oriented to be located on a plane perpendicular to a central longitudinal axis of the nozzle tip 10 and/or central flow channel 24. The inlets 52 of the exiting flow channels can be located so as to contact the junction of the tip base 36 and/or branching portion 40, as well as the central flow channel 24. The ports 54 of the exiting flow channels 50 can contact the exterior or outer surface 32 of the tip end 34 (or tip portion 30). An edge of the port 54 can contact the nozzle body; alternatively, the entire port 54 can be located in the tip portion 30.

Each port 54 can join or connect with a groove 91. The exiting flow channel 50 and the groove can define a resin flow pathway that contains a sharp angle or curve in it. The edges of each groove can define a plane that intersects its corresponding exiting flow channel 50 at a perpendicular angle. It is believed that when resin is forced through these sharply angled, nonlinear pathways, that the resin generates or experiences turbulence that causes the resin to move in a swirling path that causes the resin to scour the surfaces near it (i.e., a housing holding the nozzle tip).

Although this embodiment has been described in terms of structures and pathways oriented at perpendicular or right angles, other embodiments can adopt structures and pathways having sharp angles less than 90 degrees, such as between 45-135 degrees, 60-120 degrees, 80-100 degrees, or 85-95 degrees.

Embodiment: Improved Nozzle Tip with Neck Portion

As shown in FIGS. 1-9, embodiments of this nozzle tip 10 can include a nozzle body 20 indirectly connected to a tip portion 30, with a neck portion 60 positioned between the nozzle body 20 and the tip portion 30. Thus, the neck portion 60 can separate the nozzle body 20 and the tip portion 30. The nozzle body 20 can include a nozzle base portion 26 for connecting to a resin-dispensing apparatus and a nozzle crown 29 at the end opposite the nozzle base portion 26. The neck portion 60 can include first and second ends 62, 64 on opposite sides of the neck portion 60, a first end 62 for connecting with the nozzle crown 29 and/or the central flow channel 24 of the nozzle body 20 and a second end 64 for connecting with the tip portion 30. The tip portion 30 can include a tip base 36, for connecting with the second end of the neck portion 60, and a tip end 34 on the side or end opposite of the tip base 36. The tip end 34 and the tip base 36 can meet at a tip shoulder 37.

In some embodiments, such as shown in FIG. 1, the nozzle tip 10 can be arranged around a central longitudinal axis and include structures with round, circular, or oval edges or boundaries, such as a cylindrical nozzle body 20, a cylindrical neck portion, and a conical tip portion 30. The nozzle tip 10 can have an overall tapering profile, with the nozzle base portion 26 having the largest circumference or diameter in the nozzle tip 10, with the nozzle crown 29 having a circumference or diameter equal to or smaller than the nozzle base portion 26, the tip base 36 having a circumference or diameter equal to or smaller than the nozzle base portion 26, and the tip end 34 (which can come to a sharp point or a blunt hump at its apex 35) having a circumference or diameter smaller than the tip base 36. However, individual portions of the nozzle tip 10 can have a smaller or larger circumference or diameter while the entire nozzle tip 10 possesses a generally, if imperfectly, tapering profile. For example, the neck portion 60 can have a smaller circumference or diameter than the neighboring nozzle body 20 and tip portion 30.

As shown in FIG. 2, those boundaries can be polygonal; they can also be irregular, textured, or have a rough exterior surface.

As shown in FIGS. 3-6, in the nozzle body 20, the nozzle crown 29 can be positioned to surround the neck portion 60 and define an annular ring or a collar around the neck portion 60. An inner edge 27 of the nozzle crown 29 can attach to the neck portion 60, while an outer or peripheral edge of the nozzle crown 29 can define the periphery of the nozzle crown 29. The nozzle crown 29 can include a depression or indentation that defines a nozzle trough 67 positioned between the inner and outer edges 27, 28 of the nozzle crown 29. Where the nozzle crown 29 defines an annular ring around the neck portion 60, the nozzle trough 67 can define a depression or groove positioned in another annular ring around the neck portion 60.

As shown in FIGS. 1 and 3-4, the inner and outer edges 27, 28 of the nozzle crown 29 can define the inner and outer edges of the nozzle trough 67. In some embodiments, the nozzle trough 67 can include an arcing or curved structure between the inner and outer edges of the nozzle crown 29 and of the nozzle trough 67. In other embodiments, the nozzle trough 67 can include flat surfaces having that angle or slope, rather than curving surfaces. In some embodiments, the nozzle crown 29 can have an inward-extending slope or angle so that the surface of the nozzle crown 29 does not define a plane perpendicular to a central longitudinal axis of the nozzle tip 10 or the central flow channel 24.

Figure 9:
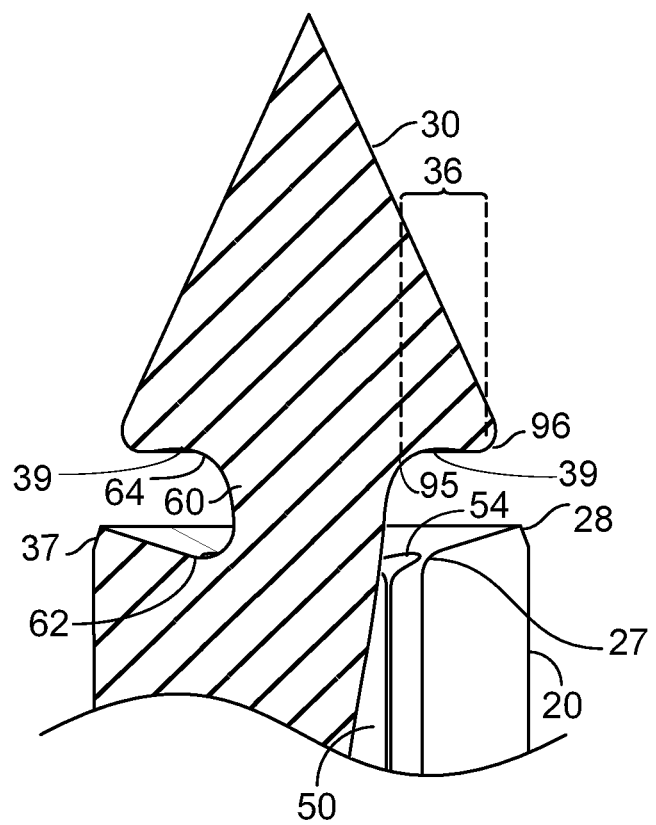
FIG. 9 shows a partial side view of a cross-section of an embodiment of a nozzle tip having a neck portion (FIG. 1), the cross-section made through a central longitudinal axis of the nozzle tip.

As shown in FIGS. 4 and 9, the edges 27, 28 of the nozzle crown 29 can have different elevations relative to each other; for example, the inner edge 27 can have an elevation closer to the nozzle base portion 26 than the elevation of the outer edge 28 relative to the nozzle base portion 26. Alternatively, the inner edge 27 of the nozzle crown 29 can be said to be located further from the tip base 36 and/or tip end 34 than its outer edge 28 or a plane defined by the inner edge 27 can be located closer to the nozzle body 20, closer than a plane defined by the outer edge 28.

As shown in FIGS. 1 and 3-4, the nozzle base portion 26 and the nozzle crown 29 can meet to define a nozzle shoulder 86. The outer edge 28 of nozzle crown 29 can include an elevated nozzle shoulder 86 around its periphery, such that the periphery of the nozzle shoulder 86 is configured at a different elevation than the rest of the nozzle crown 29. It is preferred that the elevation of the nozzle shoulder 86 accentuates the indentation created by the nozzle trough 67; that is, the elevated nozzle shoulder 86 can provide the top or outer boundary of the nozzle trough 67. Thus, a cross-section of the nozzle tip 10 can have a nozzle shoulder 86 having an acute angle where the nozzle crown 29 meets the nozzle body 20, such angle being between 0-90 degrees, 30-60 degrees, or 40-50 degrees, or being about 45 degrees.

It is preferred that the nozzle trough 67 be smooth and free from protrusions and indentations.

The nozzle body 20 can include a central flow channel 24 positioned along a central longitudinal axis of the nozzle tip 10, with one end of the central flow channel 24 for connecting to a resin-dispensing apparatus and the other terminal end 25 branching into one or more exiting flow channels 50. It is preferred that the exiting flow channels 50 do not intersect in their flow paths.

As shown in FIG. 4, for example, the neck portion 60 can have a circumference or diameter that is smaller than the circumference or diameter of the nozzle crown 29 and the tip base 36, providing a shaft or stemlike structure between the nozzle body 20 and the tip portion 30. The neck portion 60 can include a tapering portion 77 that extends into the interior of the central flow channel 24. The tapering portion 77 can terminate in a sharp point or a blunt end; preferably, the terminating point is positioned along a central horizontal axis shared with the nozzle body 20, central flow channel 24, tip portion 30, and/or tip end 34. The length of the tapering portion 77 can be greater than the length of the remainder of the neck portion 60. It is preferred that the length of the tapering portion 77 be less than one-half, one-fourth, one-eighth, or one-sixteenth of the length of the nozzle body 20.

As shown in FIGS. 1, 3-4 and 9, the tip portion 30 can include a tip base 36 for connecting with the second end of the neck portion 60 and a tip end 34 on the side opposite of the tip base 36. The tip portion 30 can be generally conical, frustoconical, trapezoidal, pyramidal or any other polygonal shape; it can include a tip base 36 that tapers to a tip end 34, and the tip end can have a sharp or blunt point. It is preferred that the outer surface 32 of the tip portion 30 be smooth and free of protrusions and indentations.

The tip base 36 can be positioned to face the nozzle crown 29, connected by the neck portion 60 between them 36, 29. The neck portion 60 can have the same central longitudinal axis as the nozzle body 20 and/or the central flow channel 24. The neck portion 60 can have a circumference or diameter that is smaller than the circumference or diameter of the tip base 36; the neck portion 60 can have a circumference or diameter that is smaller than the circumference or diameter of the nozzle crown 29. It is preferred that the circumference or diameter of the tip base 36 is smaller than the circumference or diameter of both the tip base 36 and the nozzle crown 29.

The tip base 36 can surround the neck portion 60 and define a ring around the neck portion 60, the ring being an annular ring where the neck portion 60 has a round, circular, or ovate circumference. An inner edge 95 of the tip base 36 can attach to the second end of the neck portion, while an outer or peripheral edge of the tip base 36 can define the periphery of the annular ring. The tip base 36 can include a depression or indentation that defines an annular tip trough 39 positioned between the inner and outer edges 95, 96 of the tip base 36. The inner and outer edges 95, 96 of the tip base 36 can define the inner and outer edges of the tip trough 39. In some embodiments, the tip trough 39 can define an arcing or curved structure (i.e., resembling an umbrella in structure); in other embodiments, the tip trough 39 can include flat surfaces having that angle or slope, rather than curve. The tip trough 39 can be concave, convex, flat, or angled; it can also define a doughnut-shaped or toroidal groove between the top portion 30 and the nozzle body 20. It is desired to create a washing effect similar to that obtained by directing a liquid against the interior surface of the bowl of a spoon. It is preferred that the tip trough 39 be smooth and free from protrusions and indentations.

As shown in FIGS. 4 and 9, the outer edge 96 of tip base 36 can include an elevated tip shoulder 37 around its periphery, such that the periphery of the tip base 36 is configured at a different elevation than the rest of the tip base 36 or the tip portion 30. It is preferred that the elevation of the tip shoulder 37 accentuates the indentation of the tip trough 39; that is, the elevated tip shoulder portion provides the outer boundary of the tip trough 39.

As shown in FIGS. 1-9, the nozzle tip 10 can include a nozzle body 20 connected to a tip portion 30, with a neck portion 60 positioned therebetween. On one end, the nozzle body 20 can include a nozzle base portion 26 for connecting to an apparatus for dispensing the flowable material; on the opposite end, the nozzle body 20 can include a nozzle crown 29. The nozzle crown 29 can encompass or surround a terminal end 25 of the central flow channel 24. The nozzle crown 29 can be disposed around the neck portion 60, with the exiting flow channels 50 creating outlets or ports 54 defining openings in the nozzle crown 29 for allowing the outflow of a flowable material from the interior of the nozzle body 20 to the exterior of the nozzle body 20.

The central flow channel 24 can run the length of the nozzle body 20, or a portion thereof, with one end for connecting to a reservoir of container of flowable material or an apparatus for dispensing such materials. The other end of the central flow channel 24 can branching into a plurality of exiting flow channels 50. Each exiting flow channel 50 can describe a straight or angled or arcing passageway between the central flow channel 24 and the exterior of the nozzle tip 10. Each exiting flow channel 50 can include two ends opposite each other, including an inlet 52 at a first end of the exiting flow channel 50, the inlet 52 communicating with the central flow channel 24. Each exiting flow channel 50 can include a port 54 at a second end opposite the first end, the port 54 communicating with the nozzle crown 29.

The exiting flow channels 50 can have one end that is larger than the other; for example, the ports 54 can define larger openings than their corresponding inlets 52. Here, as the resin is directed out of the central flow channel 24, the resin can move into exiting flow channels 50 that decrease in diameter or circumference throughout their length, such that the resin is forced into increasingly narrower channels or pathways as it exits the interior of the nozzle tip 10.

The tip portion 30 can include a tip end 34 for dispensing the flowable material and a tip base 36 on the end opposite the tip end 34, the tip base 36 disposed around the neck portion 60. The tip portion can have a relatively broader tip base 36 that narrows to a relatively narrower tip end 34. The tip portion can be pyramidal, frustoconical, or domelike in shape.

As shown in FIG. 4, the neck portion 60 can include a series or plurality of segments connected to each other, including a first neck segment 74 attaching to the tip base 36, a second neck segment 75 attaching to the nozzle crown 29, and a third neck segment 76 extending into the central flow channel 24, respectively. Additional segments can be positioned between or around or adjacent to these segments 74, 75, 76.

The third neck segment 76 can include a tapering portion 77 that extends into the interior of the central flow channel 24. The third neck segment 76 can separate into partitions 78 that separate the exiting flow channels 50 from each other; the partitions 78 of the third neck segment 76 can define the inner surfaces of the exiting flow channels 50. The partitions 78 cab define a portion of each inlet 52, where the central flow channel 24 divides into multiple exiting flow channels 50. The inlets 52 can be defined on their inner edges by the partition 78 or the tapering portion 77, with the remaining edges of the inlets 52 defined by the outer edge of the central flow channel 24.

It is preferable that the exiting flow channels 50 be radially disposed around the second neck segment 75 and/or the third neck segment 76. The third neck segment 76 can end in a blunt or pointed end.

As shown in FIGS. 1-9, a nozzle tip 10 can include a nozzle body 20 joined to a tip portion 30, the nozzle body 20 having a nozzle crown 29 enclosing one end of the nozzle body 20, and a central flow channel 24 disposed in the interior of the nozzle body 20. The tip portion 30 can include: a tip end 34 tapering away from the nozzle body 20; a neck portion 60 separating the tip end 34 from the nozzle body 20; and a segment 77 extending in a tapering fashion into the central flow channel 24. The tip end 34 can include a blunt end or sharp point 35 that extends away from the nozzle body 20 on one end. The opposite end of the tip end 34 can join or connect to the shoulder portion, which can have a narrower circumference or perimeter than the base 36 of the tip end 34. The neck portion 60 can join or connect to the segment 77. The segment 77 can divide the central flow channel 24 into a plurality of exiting flow channels 50, each exiting flow channel 50 having an end or port 54 communicating with the nozzle crown 29. The segment 77 can extend into the central flow channel 24, preferably through a central longitudinal axis of the central flow channel 24. The segment 77 can define multiple panels or partitions 78 that form an interior surface of each exiting flow channel 50, the outer surface of each exiting flow channel 50 being provided by portions of the inner surface of the central flow channel 24.

It is preferred that the inlets 52 and ports 54 define holes or openings that are curved or kidney bean-shaped (i.e., FIGS. 1-2, 7-8), but round, oval, or teardrop-shaped and other shapes are also acceptable.

A toroidal-shaped space can be defined by the base 36 of the tip portion 30, the neck portion 60, and the nozzle crown 29; see FIG. 9. The toroidal shape can be accentuated by the presence of a tip trough 39 in the tip base 36, a nozzle trough 67, and/or an angled nozzle base portion 26. The flowable material can be through the central flow channel 24 and the exiting flow channels 50, respectively, and delivered into the toroidal space. There, the flow of the material can wash out residual traces from the tip base 36 and prevent the accumulation of flowable material at that location. After the flowable material scours clean the tip base 36, it can traverse the outer surface 32 of the tip portion 30 to the tip end 34, and be dispensed from the nozzle tip 10.

As shown in FIGS. 1-9, resin can flow through an apparatus for delivery through the nozzle tip 10. Resin can be introduced into the nozzle tip 10 via a central flow channel 24 in the interior of the nozzle body 20. The central flow channel 24 can be positioned along a central longitudinal axis of the nozzle tip 10, with one end of the central flow channel 24 for connecting to a resin-dispensing apparatus and the other terminal end 25 dividing or branching into a plurality of exiting flow channels 50. Each exiting flow channel 50 can include an inlet 52 for transporting resin from the central flow channel 24 to the exiting flow channel 50, and can include a port 54 for transporting resin from the exiting flow channel 50 to the exterior of the nozzle body 20.

As particularly shown in FIGS. 3-4, each port 54 can communicate with the nozzle crown 29, thus directing the resin to flow through the ports 54 and along the exterior surface of the neck portion 60 toward the tip portion 30. The resin can flow along the exterior surface of the neck portion 60 to arrive in the tip trough 39; the resin can flow along the nozzle trough 67 to the nozzle shoulder 86 and drip or flow to the tip trough 39.

As the resin accumulates in the tip trough 39, the resin can flow over and around the outer edge 96 of the tip base (i.e., the tip shoulder 37), and flow over the outer surface 32 of the tip portion 30 to the tip end 34, which delivers the resin to its destination.

In preferred embodiments, the tip trough 39 can define an indentation with an arcing or curved profile (when viewed in cross-section), while the nozzle trough 67 can define an indentation with an angled, overhanging profile. It is envisioned that resin flowing from the nozzle body 20 can be guided from the ports 54 of the exiting flow channels 50 to flow along the neck portion 60 and/or along the nozzle trough 67 into the tip trough 39; from there, the resin can collect in the tip trough 39 to flow over the tip shoulder 37 and continue along the outer surface 21 of the nozzle body 20 until it is delivered from the tip end 34 to its destination.

For nozzle tips 10 with cylindrical nozzle bodies 20, the neck portion 60 generally has a narrower circumference than the tip portion 30 at its widest portion and a narrower circumference than the nozzle body 20 at its widest circumference. In nozzle bodies 20 having other shapes, the cross-section of the neck portion 60 similarly has a smaller size than cross-sections of the tip portion 30 and the nozzle body 20 at their widest points, when those cross-sections are viewed at planes perpendicular to the longitudinal axis of the central flow channel 24 through which the resin travels through the nozzle body 20.

Typically, a resin travels through the nozzle body 20 via the central flow channel 24 within the nozzle body 20 and then travels through the one or more exiting flow channels 50 that, in turn, communicate with the shoulder 86 of the nozzle body 20. The resin is then extruded from the ports 54, at the end of the exiting flow channels 50, to the exterior of the nozzle body 20. The resin can then move from the surface of the nozzle crown 29, which can have a nozzle trough 67 or an outwardly sloping surface that directs the resin toward the facing tip base 36. The nozzle trough 67 can be concave, convex, flat, or angled; it is desired to create a washing effect similar to that obtained by directing a liquid against the interior surface of the bowl of a spoon In some conventional nozzle tips 10 of a similar configuration, the neck portion 60 forms a right angle or other sharp angle where it meets the shoulder 86 of the nozzle body 20 at the shoulder joint 62. It can also form a similar right or sharp angle where the neck portion 60 meets the tip portion 30 at the tip joint 64, the giving rise to creases or corners that entrap resin. In embodiments of the present invention, the angled surface of the nozzle crown 29 and/or the grooved surface of the tip trough 39 can produce a tornado-like force to the resin that generates a washing action against the tip base 36 so as to minimize the accumulation of resin at that location, and thus minimizing the effect of a dead spot at that location.

When the resin strikes the tip base, which can include a tip trough 39 with a curved surface, the movement of the resin can introduce a scouring action that cleans away residual resin already collected in the tip base 36. This scouring action can be likened to the flow produced when a liquid is directed against the inner surface of a spoon.

In particular, as the flowable materials encounters the troughlike structure of the tip trough 39, turbulence within the flowable material can be generated in the troughlike region. Such turbulence can result in the flowable material flushing flowable material away from the nozzle tip and scour away residual accumulation left by flowable materiel that flowed through the nozzle tip at an earlier time. The turbulence generated by this feature can minimize the accumulation of flowable materials or buildup of other residue outside of the nozzle tip. In turn, this feature can decrease the amount of time and material required to clean the nozzle tip between uses. This feature can also result in improve the completeness or the efficiency in the delivery of flowable material via the nozzle tip. Further, this feature can also guide the resin out and away from the delivery channels, further facilitating the smooth, even flow of resin through the interior of the nozzle body 20.

These features minimize the accumulation of resin between the neck portion 60 and tip base 36. It can also provide a flow channel that guides the resin out and away toward the tip end 34 in a smooth, even flow of resin. These configurations provide for a smooth, crease-free, and seam-free transition in the surface where the neck portion 60 communicates with the nozzle body 20 and the surface where the neck portion 60 communicates with the tip portion 30. It is preferred that the nozzle crown 29 and tip base 36 lack protrusions or obstructions to impede the flow of the resin.

As described above, these embodiments of nozzle tips 10 can also incorporate a branching portion 40 at the internal location within the nozzle body 20 where the central flow channel 24 meets the multiple exiting flow channels 50, where the branching portion 40 has a convex surface that protrudes away from the tip end 34 of the tip portion 30. In preferred embodiments, the branching portion 40 is conical or pyramidal in shape, with a pointed end or branch protrusion 46 pointing away from the tip end 34.

Embodiment: Improved Nozzle Tips in Housing

Some embodiments of the nozzle can be shaped to fit within a housing. Such housing can be in communication with an apparatus containing a resin or other flowable material to be dispensed (not shown). For example, an injection nozzle can be combined with an injection molding machine to deliver a molten material into a mold cavity. Similarly, an inkjet printer can use a nozzle to dispense ink, or a syringe can use a nozzle to dispense a variety of liquids.

In some embodiments, resin or other flowable material can be directed toward the housing, so that an interior surface of the housing can guide the destination of the resin and/or widen the flow path of the resin. It is envisioned that the nozzle can work in conjunction with an improved nozzle tip 10 to minimize the accumulation of resins at locations where the nozzle tip 10 communicates with its housing.

In other embodiments, the nozzle can be disposed in a housing so that the nozzle tip 10 directs the flow of the resin in a direction away from its associated housing. For example, if the nozzle tip 10 and housing were oriented with its tip portion 30 to lie parallel with the central flow channel 24, the nozzle tip 10 can employ gravity to direct the flow of its resin away from the housing, thus preventing an accumulation of resin on its housing.

Additional Embodiments

In some embodiments, the nozzle body 20 can be cylindrical in shape; in other embodiments, the nozzle body 20 can be another regular polygonal shape, such as a rectangle, or an irregular shape. Alternatively, the nozzle body 20 can incorporate a plurality of different shapes. In some embodiments, the nozzle body 20 can be smooth; in others, the outer surface 21 can have a plurality of concave and/or convex surfaces. In some embodiments, the nozzle body 20 can be shaped to fit within a housing or terminate in a nozzle base portion 26 for connecting with an apparatus containing a resin or other flowable material to be dispensed.

Embodiments include nozzles that incorporate the improved nozzle tip 10, either with or without an associated housing. Other embodiments include apparatuses that incorporate the improved nozzle tip 10, such as injection mold machines for molding plastic materials, inkjet printers, paint dispensers, and tattoo guns.

The nozzle tips 10 described herein are not limited to embodiments having fixed or continuous tip portions 30. In some embodiments, the tip portions 30 can disengage from the nozzle tip 10 (i.e., for cleaning, repair, or replacement). For example, such a removable tip portion 30 could be engaged with a reciprocal pin, such as a valve-gated tip portion, or other engaging mechanism known to in the art.

It is envisioned that the embodiments described herein can be used to dispense a wide variety of liquids or flowable materials, such as hot resins, powders, paints, inks, medicines, foods, beverages, cleaning materials, household chemicals, and sealants. The embodiments described herein have many potential uses in different apparatuses, such as printers dispensing ink, injection machines molding plastic parts, and syringes dispensing medicine, and other applications including delivering fertilizers, applying paints or inks, dispensing foods, applying chemicals or household cleaners, and more.

It is expected that viscosity of the material dispensed by the invention will particularly affect the preferred configuration of the nozzle tip and the nozzle in order to achieve optimum delivery of material. It is also expected that the physical properties of the dispensed materials will determine which embodiments are best suited to dispense particular materials.

For convenience, embodiments of the invention typically refer to dispensing resins for injection molding. However, it is understood that these embodiments described herein can be used for other liquids and flowable materials and for the applications, such as are described above.

Branching Portions

Some embodiments of the invention include a feature for minimizing or preventing the accumulation of resin at the location where the central flow channel 24 branches into the exiting flow channels 50. Specifically, the branching portion 40 of the central flow channel 24 can be configured to lack a pocket, depression, or other structure capable of capturing or entrapping the resin as the resins travels from the central flow channel 24 to the exiting flow channels 50. In particular, the branching portion 40 can contain a convex structure that directs the flow of the resin into the multiple flow streams.

As shown in FIGS. 3-4, the exiting flow channels 50 can extend outward from the central flow channel 24 at the common branching portion 40, defining passageways between the central flow channel 24 and the exterior surfaces (i.e., 21, 32) of the nozzle tip 10. In some conventional nozzles, such branching portion can be flat or concave, providing a place for resin to accumulate. In the present invention, the branching portion 40 can instead possess a raised or convex surface that protrudes away from the tip end 34 of the tip portion 30 and/or toward the base portion 26 of the nozzle body 20. The branching portion 40 can comprise a branch base portion 42 communicating with the tip portion 30 and a convex body portion 40 facing or extending away from the tip portion 30. As flowing resin encounters this raised, convex branching portion 40, the resin is forced to move past the branching portion 40 and into the inlet 52 of an exiting flow channel 50 (or other kind of delivery channel) to be dispensed out of the nozzle tip 10. The branching portion 40 provides a structure for guiding the flowing resin from the central flow channel 24 into the separated exiting flow channels 50, instead of having a space or pocket or crease where a portion of the resin can pool and separate itself from the rest of the flowing resin.

In preferred embodiments, the branching portion 40 can be conical, frustoconical, trapezoidal, domelike, or pyramidal in shape, although any convex shape can be used, and can have a pointed end or protrusion 46 in opposition to the branch base portion 42 that communicates with the tip portion 30. That protrusion 46 can be sharply pointed, bluntly pointed, or conical in shape; it can also be smooth and free of projections and/or indentations, or can be round or dome-shaped. It is preferred that the central longitudinal axis of the branching portion 40 lies on the same central longitudinal axis as the central flow channel It is preferred that the branch base portion 42 have a circumference or diameter that is smaller than the circumference or diameter of the central flow channel 24. In a cross-section of the branching portion 40, through its branch base portion 42 and the apex of the branching point or protrusion 46, the branch protrusion 46 can define a sharp point whose cross-section has an acute or narrow angle. Alternatively, a cross-section of the branch protrusion 46 can define a comparatively broader, blunter branching portion 40 with an apex 47 defining an obtuse angle. Some embodiments can have a branching portion 40 that defines a right angle (90 degrees) or an obtuse angle (more than 90 degrees) at the apex 47 or define a smooth, curved surface lacking a defined point. It is expected that the viscosity of the resin will determine which configuration is preferred for particular embodiments.

Non-Radially arranged flow paths

Centrifugal force is the tendency of an object following a curved path to move outward and away from the center of the curve. The exiting flow channels 50 can be spaced apart and configured, relative to the central flow channel 24 that they communicate with, in generally straight or curved paths which can introduce a centrifugal force on the resin when the resin travels through the exiting flow channels 50. Centrifugal force can be introduced by the inertia of the movement of the resin as it travels along in a generally curved or semicircular path as it is diverted from the direction it flows in the central flow channel 24 to the different direction it flows in the exiting flow channels 50. The configuration of these flow paths can result in an application of centrifugal force on the resin, driving the resin to move away from the terminal end 25 of the central flow channel 24, through the inlets 52 and outward toward the ports 54, thus decreasing the amount of resin that remains behind and accumulates at the branching portion 40 of the exiting flow channels 50.

As shown in FIGS. 1-4, if the nozzle tip 10 is oriented so that the nozzle body 20 is at the bottom and the tip end 34 is the top, the exiting flow channels 50 can be configured to extend outward in a vertical direction, a horizontal direction, or both. That is, the exiting flow channels 50 can extend in a sloped or angled or arcing manner, from the central flow channel 24 and through an inlet 52 and a port 54, successively, to the outer surface 32 of the tip portion 30, so that each port 54 is closer to the tip end 34 than its corresponding inlet 52. In other embodiments, the exiting flow channels 50 can extend outward in paths perpendicular to a central longitudinal axis along the central flow channel 24.

Each exiting flow channel 50 can have an inlet 52 at the location where the exiting flow channel 50 meets the central flow channel 24. It is preferred that the exiting flow channels 50 define flow paths that are separate from each other; that is, they do not intersect or meet each other.

The exiting flow channels 50 can be disposed non-radially on a plane perpendicular to the longitudinal axis of the central flow channel 24. When viewed from above, if the exiting flow channels 50 were extended infinitely, they would not intersect to define a center point of a circle; instead, the exiting flow channels 50 would define secants around a common circle. When viewed from above, the exiting flow channels 50 cannot intersect with the central longitudinal axis of the central flow channel 24; if extended indefinitely, the pathways defined by the exiting flow channels 50 do not intersect with or contact the central longitudinal axis of the central flow channel 24.

In preferred embodiments, the exiting flow channels 50 can define secants disposed around the circumference of the central flow channel 24, and those secants do not overlap or intersect. In some embodiments, the exiting flow channels 50 define divergent, non-intersecting flow paths in the interior of the nozzle tip to the outer surface 32 of the nozzle tip 10. In other embodiments, the exiting flow channels 50 define divergent, non-intersecting flow paths in the interior of the nozzle tip to the outer surface 21 of the nozzle body 20 or to the neck portion 60.

As shown in FIG. 4, the exiting flow channels 50 can be directed in an angle extending from the base portion 26 to the outer surface 21 of the nozzle body 20. The exiting flow channels 50 can angle outward from the branching portion 40 of the central flow channel 24 toward the toward the outer surface 21 of the nozzle body 20. The exiting flow channels 50 can angle upward direction relative to the horizontal plane defined by the inlets 52 and the horizontal plane defined by the ports 54. It is preferred that the exiting flow channels 50 are configured in a horizontal direction with an angle between 10-45 degrees with respect to that horizontal plane and a horizontal direction with an angle between 10-30 degrees is more preferred (also called the vertical nozzle plane).

Specific embodiments of an improved nozzle tip according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. It is understood to encompass the present invention and any and all modifications, variations, or equivalents that fall within the spirit and scope of the basic underlying principles disclosed and claimed herein.

What is claimed is:

1. A nozzle tip for dispensing a flowable material comprising:
    a nozzle body fixed to a tip portion, with a neck portion positioned therebetween, the nozzle body including:
        a nozzle base portion on a first end of the nozzle body, the nozzle base portion for connecting to an apparatus for dispensing the flowable material;
        a nozzle crown at a second end of the nozzle body, opposite the nozzle base portion, the nozzle crown disposed around the neck portion;
        a central flow channel within the nozzle body, a terminal end of the central flow channel branching into a plurality of exiting flow channels; and
        the plurality of exiting flow channels, each exiting flow channel being a secant disposed about a circumference of the nozzle body, each exiting flow channel being in a plane not overlapping or intersecting the other exiting flow channels and having:
            a first end comprising an inlet, the inlet communicating with the central flow channel, and
            a second end opposite the first end comprising a port, the port communicating with the nozzle crown;
    the tip portion having a tip end and a tip base opposite the tip end, the tip base disposed around the neck portion and having a curvilinear tip trough integral with each of the plurality of exiting flow channels and approximately perpendicular to the central flow channel to effect a scouring action for cleaning away residual material; and
    the neck portion having a first neck segment attaching to the tip base, a second neck segment attaching to the nozzle crown, and a third neck segment extending into the central flow channel, respectively;
    wherein the exiting flow channels are arranged radially around the third neck segment, and each exiting flow channel abuts the third neck segment; and
    wherein the flowable material is transported through the central flow channel and each of the tip troughs with a turbulent motion within the exiting flow channels, respectively, and is extruded through the ports in a lateral turbulent flow toward the tip base.

2. The nozzle tip of claim 1, wherein the third neck segment tapers to a point.

3. The nozzle tip of claim 1, an outer edge of the nozzle crown having an elevation closer to the tip portion than an inner edge of the nozzle crown.

4. The nozzle tip of claim 3, the nozzle crown surrounding the neck portion, and a juncture between the nozzle crown and the second neck segment defining an acute angle.

5. The nozzle tip of claim 3, the tip base surrounding the first neck segment, and the tip base comprising a tip trough defining a groove surrounding the neck portion.

6. The nozzle tip of claim 5, wherein the neck portion is cylindrical and the tip trough defines an annular ring around the neck portion.

7. The nozzle tip of claim 6, wherein the diameter of the neck portion is smaller than the diameter of the tip base, and the diameter of the tip base is smaller than the diameter of the nozzle crown.

8. An apparatus comprising the nozzle tip of claim 1.

9. A nozzle tip for dispensing a flowable material comprising:
    a nozzle body fixed to a tip portion, the nozzle body having a nozzle crown enclosing an end of the nozzle body, and an interior central flow channel; and
    the tip portion having, respectively:
        a tip end with a base tapering away from the nozzle body;
        a neck portion separating the tip end from the nozzle body; and
        and having a curvilinear portion integral with the nozzle body and substantially perpendicular to the central flow channel for directing the flowable material with a turbulent motion for scouring residual material from the tip portion;
        a branch point extending in a tapering fashion into the central flow channel, the branch point dividing the central flow channel into a plurality of exiting flow channels, each exiting flow channel having an end communicating with the nozzle crown and being a secant, and in a plane not overlapping or intersecting with another exiting flow channel;

the curvilinear portion being fixed within each of the exiting flow channels;

wherein a toroidal space located around the neck portion is defined by the base of the tip end, the neck portion, and the nozzle crown; and wherein the flowable material can be dispensed through the central flow channel, the exiting flow channels, and the toroidal space, respectively, before delivery to the tip base.

10. The nozzle tip of claim 9, wherein the branch point defines exiting flow channels radially arranged around a central longitudinal axis of the nozzle body.

11. The nozzle tip of claim 9, the nozzle crown surrounding the neck portion, and an outer edge of the crown nozzle extending away from the neck portion and toward the tip end.

12. The nozzle tip of claim 9, the tip end including a tip base surrounding the neck portion, the tip base comprising a tip trough defining a groove surrounding the neck portion.

13. The nozzle tip of claim 11, the tip base surrounding the neck portion, and the tip base comprising a tip trough defining a groove surrounding the neck portion.

14. The nozzle tip of claim 9, wherein the neck portion is cylindrical and the tip trough defines an annular ring around the neck portion.

15. The nozzle tip of claim 11, wherein the neck portion is cylindrical and the tip trough defines an annular ring around the neck portion.

16. The nozzle tip of claim 15, wherein the circumference of the nozzle crown is greater than the circumference of the tip base.

* * * * *